Figure 1:
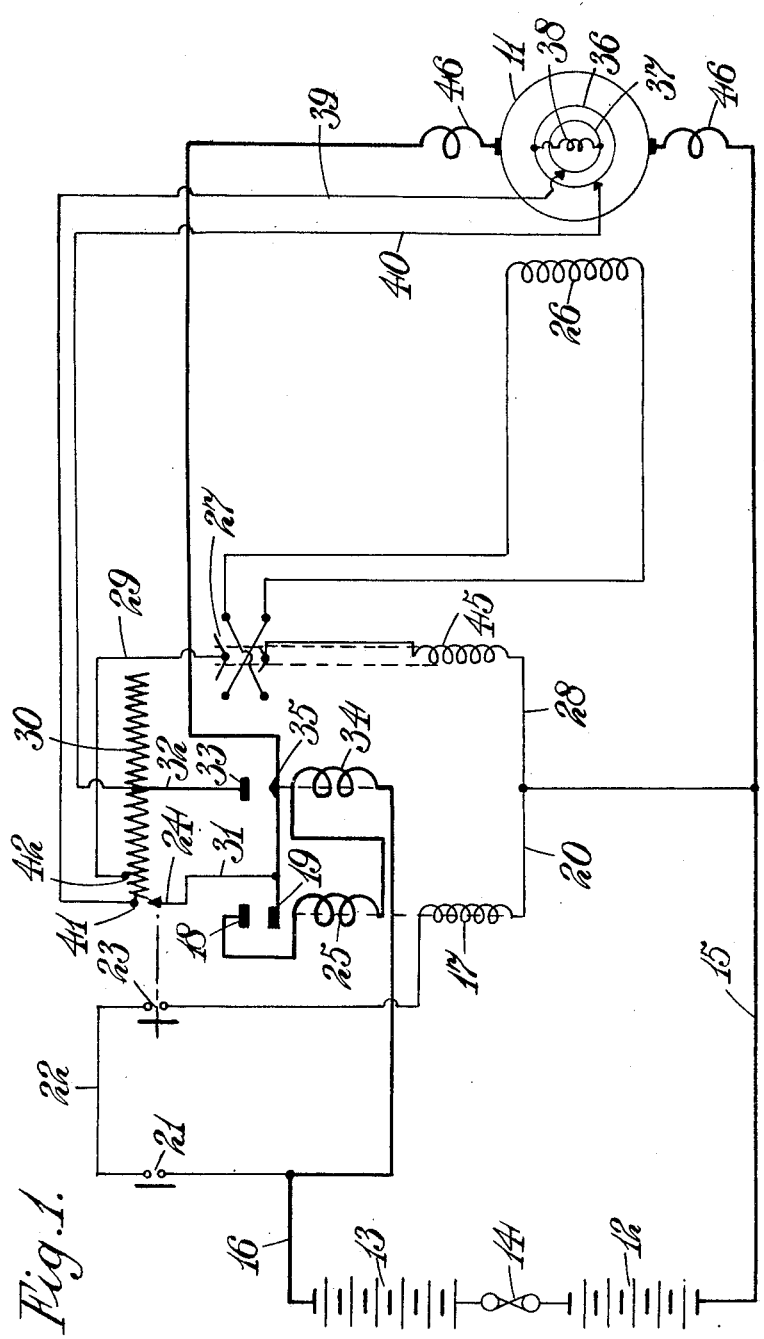

May 6, 1952 A. E. R. ARNOT 2,595,749
ELECTRIC MOTOR-DRIVEN INSTALLATION
Filed Sept. 8, 1947 3 Sheets-Sheet 1

INVENTOR
A. E. R. Arnot
By Watson, Cole, Grindle & Watson

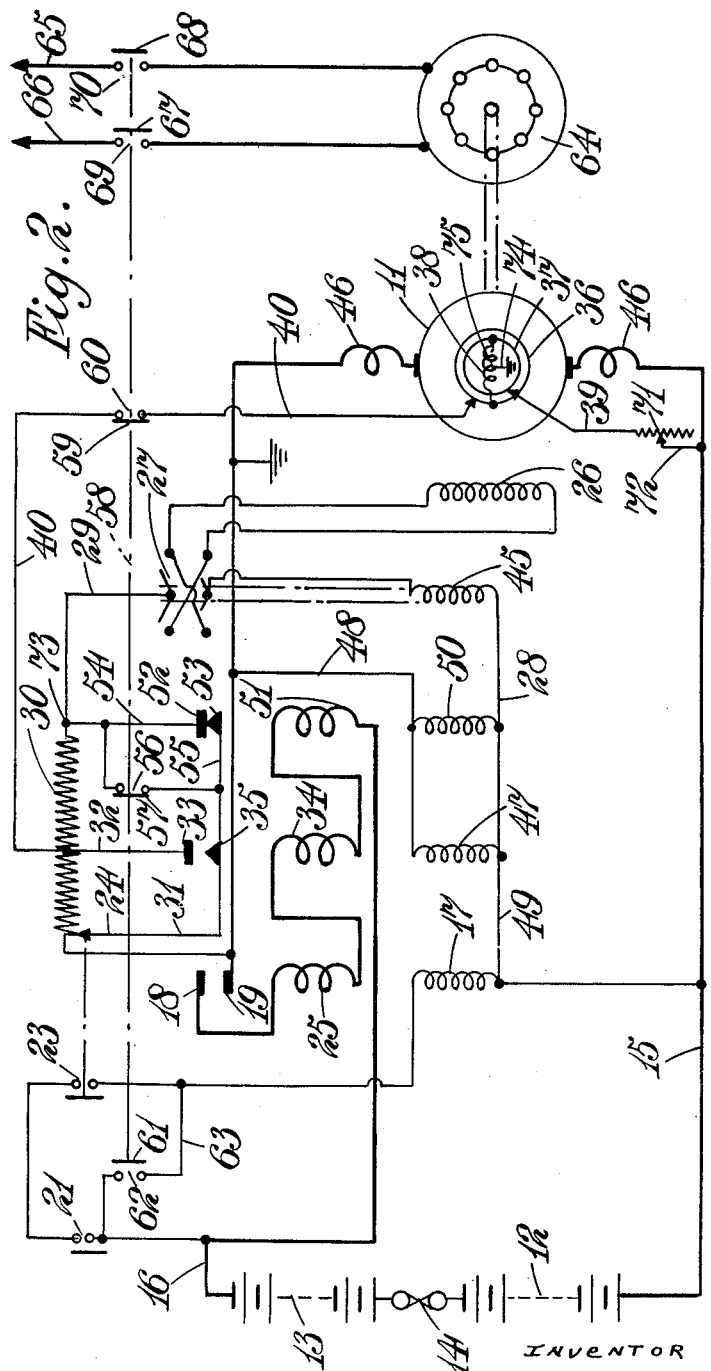

May 6, 1952  A. E. R. ARNOT  2,595,749
ELECTRIC MOTOR-DRIVEN INSTALLATION
Filed Sept. 8, 1947  3 Sheets-Sheet 3
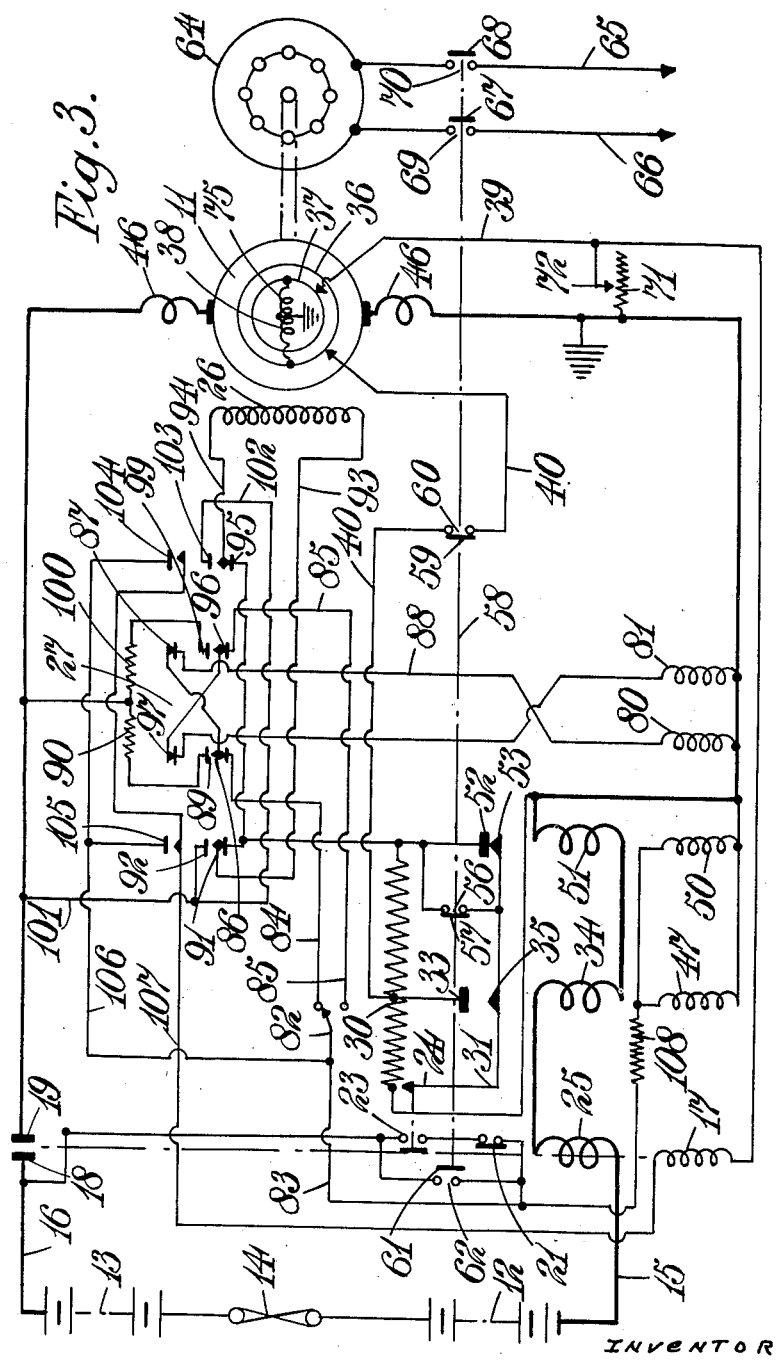
INVENTOR
A. E. R. Arnot
By Watson, Cole, Grindle & Watson Patented May 6, 1952

2,595,749

UNITED STATES PATENT OFFICE 2,595,749

ELECTRIC MOTOR-DRIVEN INSTALLATION

Alfred Erwin Reginald Arnot, Isleworth, England, assignor to Emmanuel Kaye and John Reginald Sharp, Isleworth, England Application September 8, 1947, Serial No. 772,651
In Great Britain September 13, 1946

7 Claims. (Cl. 192—.02)

This invention comprises improvements in or relating to electric motor-driven installations.

It is an object of the invention to provide a motor-driven installation which comprises some of the advantages which accrue from the use of shunt-wound electric motors and also some of the advantages which accrue from the use of series-wound motors. Shunt-wound motors have the advantage that their speed can readily be varied over a wide range by control of the field winding, and that they have an upper limit of speed which is not exceeded however light the load. Moreover when a shunt-wound motor is operated from a storage battery, it is possible to use the motor as a dynamo for recharging the battery. For example when a shunt-wound motor is used as a traction motor on a vehicle, the motor can be employed as a brake when the vehicle is being stopped or going down hill and will recharge the battery under these conditions. These advantages do not pertain to series-wound motors, but on the other hand a series-wound motor has a better starting torque and will operate better than a shunt-wound motor at low speeds under heavy loads.

According to the present invention, an electric motor-driven installation comprises, in combination, a direct current motor with shunt field winding, means for regulating the current in said field winding and electrically-operated means responsive to motor armature current, the said means being so connected in the circuit of the installation that at a predetermined armature current value of the direct current motor they will act to modify the shunt field current control means so as to increase the field strength, and at a lower predetermined armature current value they will act to decrease the field strength.

The installation may comprise a direct current motor with shunt field winding, a regulating resistance in series with said field winding, an electromagnetically-operated switch having an operating coil in series with the motor, switch contacts set to close at a predetermined operating current, said switch contacts being in a circuit in parallel with the regulating resistance so as to afford an additional path for field current when said predetermined current is reached and thereby to increase the field strength. Preferably said resistance and the pull-in and drop-off currents of the electromagnetically-operated switch are of such values that the switch drops off when the current is reduced by the increase of field strength due to the switch operating so that cyclic re-operation of the switch can occur. The result of the cyclic operation of the switch is that the motor is kept operating at a constant average current lying between the pull-in and drop-off currents of the switch and if the load increases the period during which the switch remains on is increased, the motor speed is automatically reduced and the operating characteristic of the motor becomes similar to that of a series-wound motor within the limits of which lie between the load at which the switch begins to operate and the load at which it is maintained continuously closed.

The provision of one or more further biasing windings on the electromagnetically-operated switch will allow the pre-determined operating current of the switch to be modified according to other conditions of speed, temperature, voltage or the like, for instance, on train systems where current limitation is imposed more by motor overload conditions than by permissible power supply as is the case with battery-operated installations, more motor load current will be allowed at high speeds due to lower field losses and better cooling. Thus an additional coil on the electromagnetically-operated switch connected in series with the motor shunt field and arranged to assist the main series coil carrying the motor load current will give the required characteristic.

Such a motor with its control installation may be of especial service in electric traction and the invention includes electric motor-driven apparature as above described when installed on a vehicle with the motor operating as a traction motor.

Preferably the resistance in series with the shunt-winding of the motor is made variable which enables the motor to be operated for load currents up to the pull-in value of the electromagnetically-operated switch as a shunt-wound motor with a definite speed corresponding to each setting of the resistance.

One important application of the invention is as an installation on a battery-operated vehicle, connections being provided to enable the motor to be employed as a dynamo for recharging the battery.

In the event of the driving motor not being compound wound, it may be necessary to polarise the electromagnetic contactor which closes the circuit in parallel with the regulating resistance, in order that excessive charging current should not operate this contactor, thus still further increasing the field strength.

On a battery-operated vehicle the motor may charge the battery, either regeneratively when the vehicle is in use, or as a dynamo operated by a special auxiliary motor installed for charging purposes and run from mains.

Specific examples of installations in accordance with the invention will now be described with reference to the accompanying drawings in which:

Figure 1 is a diagram of a simplified form of traction motor control in accordance with the invention, Figure 2 is a diagram of another traction motor control, including arrangements for battery charging, and Figure 3 is a connection diagram of a further control circuit for a traction motor employing relay-operated reversing switches.

Referring first to Figure 1, the apparatus comprises a traction motor 11 operated by two batteries 12, 13, in series with one another with a fuse 14 between them and connected to the motor through a negative line 15 and a positive line 16. The control apparatus is located in the positive line between the battery and the motor.

A main contactor is provided for closing the motor circuit which comprises a main operating coil 17 and contacts 18, 19, which are closed when the operating coil 17 is energised. The operating coil is connected to battery negative by a line 20 and to battery positive through a key-operated switch 21 by a line 22. Thus the main contactor cannot be closed unless the key-operated switch is first closed. Even when the key-operated switch 21 is closed, the motor circuit is not immediately closed by the contactor because a second pair of switch contacts 23 is arranged in series with the switch 21, the contacts 23 being mechanically connected to an arm 24 of a speed-controller hereinafter referred to. The first action of the speed-controller in its movement is to close the contacts 23 and to start the motor. The main contactor also has a series winding 25 which tends to hold the contacts 18, 19, closed whenever the motor 11 is taking a heavy current. The object of this is to prevent the contactor contacts 18, 19, from being opened except when the motor is on light load and thus to prevent them being burned away unduly.

The motor 11 has a shunt field winding 26 which is connected through a reversing switch 27 on the one hand to a negative line 28 leading to the battery, and on the other hand to a positive line 29 which is connected to a regulating resistance 30. The speed-control arm 24 works over the regulating resistance 30 and serves to determine how much resistance is in series with the shunt-field 26. The arm 24 is connected to the positive line by a connection 31.

Part way along the resistance 30 there is a connection 32 to a contact 33 of an electromagnetically-operated switch having an operating winding 34 in series with the armature of the motor 11. The effect of the winding 34 is to close the contact 33 against a contact 35 connected to the positive line leading to the motor. Therefore, when the switch 34 operates, the part of the control resistance 30 which lies between the line 32 and the point on the resistance at which the arm 24 has been placed, will be short-circuited. The effect will be to increase the current in the shunt-field 26 and to decrease the current taken by the motor-armature 11. This in turn, if the series winding 34 of the electromagnetically-operated switch is suitably calculated, will allow the contacts 33, 35, to break and will reduce the shunt current through the field winding 26 again. Consequently, the motor current will increase and the contacts 33, 35, will be reoperated. This alternate closing and opening of the contacts 33, 35, will tend to keep the motor current fluctuating at a value which lies between the pull-in and drop-off currents of the electromagnetically-operated switch, as above described.

The motor 11 has a pair of slip-rings 36, 37, which are connected to a winding 38 of an electromagnetically-operated clutch mounted on the motor-shaft between the motor and its load. The slip-rings 36, 37, receive current from two lines 39, 40, one of which is connected to the same point on the resistance 30 as that to which the contact 33 is connected, and the other of which is connected to a point 41 at the end of the resistance 30. It is to be observed that the point 41 is a little beyond the point 42 to which the line 29 of the shunt field winding is connected. As a result, when the speed-control regulating arm 24 is first brought in touch with the resistance 30, there is a very small amount of resistance (which is in series with the shunt field winding) between the point 41 and the point 42, through which a drop of voltage takes place, the point 41 being positive relatively to the point 42. It follows that the line 39 connected to the clutch-winding 38 will be positive relatively to the line 40. If, as the motor starts up, the arm 24 is moved towards the point 42 on the resistance, it will raise the potential of the line 40 while lowering the potential of the line 39 as it recedes from the point 41 to which the line 39 is connected. Consequently, the clutch current will be reduced, and if the arm 24 is moved nearer to line 32, line 40 will become positive relatively to line 39 and the current in the clutch-winding 38 will be reversed. The clutch is arranged to close with this reversed current. The initial current applied to the clutch with the line 39 positive relatively to 40 is used as a slight demagnetising current and serves to ensure that the clutch is definitely "off," that is to say disengaged, when the motor is first started. The motor field is saturated when the arm 24 is at the point 41, and this is the best condition for starting. The motor starts on no load and being on full field will run at minimum speed. As the arm 24 moves along the resistance 30 towards the line 32 the clutch will close with increasing force and put the motor on load. Thus the motor starts unloaded but is loaded gradually by the clutch which allows controlled slip. If the arm 24 is now moved further past the line 32 along the resistance 30, it begins to put sufficient resistance in series with the shunt-winding 26 to increase the speed of the motor. If the motor 11 is connected through the clutch 38 to a traction load, the higher speed ranges will only be reached on level loads or on slight gradients and under such conditions the switch 34 will not be called into operation. Should the vehicle on which the control is installed, however, reach a rising gradient, which increases the load on the motor beyond the level at which the switch 34 cuts in, the effect will be to close the switch 34 intermittently as already described, or even permanently, and to reduce the motor speed while increasing its torque, like a series wound motor. That is to say, the driver of the vehicle cannot, although he has a shunt field control, by putting the control at too high a speed, overload the motor. If the vehicle reaches a falling gradient, as the motor is shunt-wound it will act regeneratively and charge the battery, thus limiting the maximum vehicle speed.

The reversing switch 27 is in series with a winding 45. The purpose of the winding 45 is to actuate a mechanical locking device for the reversing switch so that it cannot be thrown over when the field winding 26 is energised. The mechanical arrangement of such a locking device is known per se and need not be herein further described. The motor 11 is provided with interpole windings 46 to assist commutation, but has otherwise no series field.

Referring now to Figure 2, this shows a circuit which is in substance the same as Figure 1 with the exception that additional provision is made whereby if the motor 11 is driven suitably it can be employed for charging the battery. Most of the parts in Figure 2 are the same as those shown in Figure 1 and are similarly numbered in the drawing. It will suffice, therefore, to confine the description to the parts of the figure which differ from Figure 1.

When the motor 11 is used regeneratively or as a driven machine for charging the battery, it is undesirable that the electromagnetically-operated switch 34 should operate and this switch is therefore shown in Figure 2 as being provided with an additional magnet-winding 47 on the same core as the winding 34 which serves to make the switch act as though polarised. The coil 47 is connected by a line 48 to the positive lead of the motor circuit and by a line 49 to the negative lead 15, so that as long as the contactor 25 holds the contacts 18, 19 closed, the coil 47 is energised. This energisation is not sufficient in itself to close the contacts 33, 35, but when the motor 11 draws current from the battery the coil 34 is assisted by the coil 47 to operate the contacts. On the other hand, if the motor is charging the battery, the current in the coil 34 is reversed and is opposed by the effect of the current in the coil 47, so that the contacts 33, 35, will not operate with any normal current obtainable during charging from the motor 11.

A charging current control relay is provided which comprises a shunt-winding 50 which, like the winding 47, is constantly energised during operation, a series winding 51 in series with the windings 25 and 34, and normally closed contacts 52, 53, which are opened when the charging current to the battery exceeds a predetermined value at a predetermined voltage. The contacts 52, 53, when closed, serve to short-circuit the resistance 30 by way of lines 54, 55, but when opened they put the resistance 30 in series with the shunt field winding 26 of the motor 11, thereby reducing its strength and the value of the charging current. In operation these contacts vibrate, as the contacts 33, 35, vibrate, but only when the current is flowing in the charging direction, whereas the contacts 33, 35, vibrate only when the current is flowing in the discharge direction. The contacts are capable of being short-circuited by the bridging of a pair of contacts 56 by means of a bridge-piece 57.

The bridge-piece 57 is mounted on a control-rod 58 which also carries a bridge-piece 59 for connecting contacts 60 arranged in the line 40 which runs to the clutch-winding 38. Furthermore, the control-rod 58 carries a bridge-piece 61 to close contacts 62 in a line 63 which is capable of short-circuiting the key-switch 21 and the switch 23 which normally operates the main contactor coil 17. If the control-rod 58 is moved to the right, as shown in the drawing, the contacts 62 are open, the contacts 52, 53, are short-circuited, and the clutch-circuit 40 is closed. This is the position for normal running of the motor 11 driving its load from the battery. If the control-rod 58 is moved to the left, the contacts 56 and 60 are opened and the contacts 62 are closed. This puts the contacts 52, 53, in operation, prevents the clutch 38 from operating, and closes the contacts 18, 19, irrespective of the position of the key-switch 21 or the speed-controller 24 which is connected to the contacts 23. This is the position of the parts for using the motor 11 as a dynamo to charge the battery.

A squirrel-cage motor 64 is provided on the vehicle having connections 65, 66, to a plug which can be connected whenever desired by a flexible lead to a mains supply. Two bridge-pieces 67, 68, are provided on the control-rod 58 and when these are thrown over to the left into the battery-charging position they close contacts 69, 70, respectively, which put the motor 64 in circuit. As the clutch-circuit 38 is broken at 60 the motor 11 will be disconnected from the vehicle wheels and will be driven by the motor 64 as a dynamo to charge the battery. No starting winding is required on the single-phase squirrel-cage motor 64 as it is started by the direct current motor 11 as soon as the contacts 18, 19 close, the motor 11 drawing current from the battery for this purpose.

It is to be noted as a minor point that instead of the lead 39 of the clutch-circuit being connected to one end of the resistance 30, as in the case of the example described in connection with Figure 1 of the drawing, this lead is taken, through a variable resistance 71 and line 72, to the negative line 15. The lead 40 goes as before to an intermediate point of the resistance 30 and the reversing switch 27 instead of being connected by line 29 from the point 42 shown in Figure 1, is connected from the end point 73. The clutch-winding 38 is connected to earth at 74 and there is a second clutch-winding 75 connected between the slip-ring 37 and the frame of the vehicle.

The second winding 75 of the clutch may be called a neutralising winding; it is necessary as the field current of the motor 11 when acting as a generator is variable, and tapping the demagnetising voltage off the end of the resistance 30, as in Figure 1, would be impracticable. The winding 75 is wound in such a direction as to oppose the main clutch-winding 38 and the value of the current in it is regulated by the variable resistance 71 so that it suffices to demagnetise the clutch whenever the winding 38 is cut out of operation.

Figure 3 shows a further development which includes the parts shown in Figure 2 but in which the reversing switch is operated by relay-coils 80, 81. In so far as the parts shown in Figure 3 are the same as those shown in Figure 2 and operate similarly, they are marked in Figure 3 with the same reference numerals and further description of these parts is unnecessary. It will be observed, however, that the contacts 18, 19, of the main contactor are arranged on one pole of the battery and a series coil 25 on the opposite pole, instead of being both in a lead line of the same polarity. This difference is immaterial from the point of view of operation.

For reversing the parts a two-way selector switch 82 is provided, which is connected by a line 83 and the contacts 21 and 23 to the battery line 16. The selector-switch 82, therefore, puts battery voltage on to one or other of two lines 84, 85, one line being selected for operation of the motor in one direction and the other line for the reverse direction. Considering first the circuit connected to the line 84, it will be seen that this goes to contacts 86 controlled by the relay-winding 80, thence to a contact 87 controlled by the relay-winding 81 and by line 88 to the relay-winding 80. All these contacts are normally closed, and therefore movement of the selector-switch 82 to render the line 84 live will energise the relay-winding 80. The effect will be to transfer the movable contact at 86 into engagement with the contact 89, which receives current from the battery, through the contacts 18, 19, provided the contactor 25 is closed. The contact with 89 is arranged to be made before the contact with 86 is broken, and the relay-winding 80 will therefore hold itself on. In order to prevent a momentary short-circuiting of the contacts 18, 19, a resistance 90 is included in the circuit.

Energisation of the relay-winding 80 also transfers a movable contact 91 into engagement with a contact 92 and thereby connects the shunt-winding 26, by way of a line 93, to the line 16. The other end of the shunt-winding is connected, by way of line 94, contacts 95 and lines 96, 97, to the resistance 30 and thence to the other pole of the battery.

Should the operator now turn the selector-switch 82 so that it engages the line 85 instead of the line 84, the effect will be to connect battery current through line 85 to contacts 95 which are under the control of the relay-winding 81, but the relay-winding 81 will not be energised because its circuit is broken at the contacts 97 owing to the fact that relay winding 80 is already energised. The motor therefore keeps on running in the same direction, and even if the operator breaks the control circuit at the contacts 23 the relay 80 will not fall off until the back E. M. F. of the motor 11 has dropped below the hold-on voltage of the relay 80. The circuit through 97 will be completed when the relay falls off so that when the motor is restarted the coil 81 will be energised, the contacts 96, 99 will operate through a resistance 100 in a similar way to the contacts 86, 89, through the resistance 90 already described, and a circuit will be made to the shunt-winding from the line 16 through lines 101, 102, to contact 103 and thence through contact 95 and line 94 to the shunt-winding 26. The other end of the winding 26 is connected, through line 93 and contact 91, which is now closed at the bottom, to the resistance 30. Thus the current will be flowing through the shunt-coil in the opposite direction to that in which it was flowing before. The relays are also arranged to operate contacts 104, 105, which are parallel with one another but in series, through lines 106, 107, with the operating coil 17 of the main contactor. Thus, whichever of the relay-windings 80 or 81 is energised, the operating coil 17 will be energised by the closing of either the contacts 104 or 105. This sequence of operation ensures that current cannot be applied to the motor armature until the field circuit has been completed. The operating coil is, however, cut off when the motor is stopped, so that there is no waste of energy.

A minor point of this circuit is that a swamping resistance 108 is provided in series with the coils 47, 50 of the switches 34 and 51. The object of this swamping resistance is to enable a wire to be employed for the resistance which is not materially affected by changes of temperature and therefore to ensure that the windings of the coils 47, 50, operate at the same current values after the apparatus has been in use for some time and has become warmed up, as they do when it is cold.

The advantages of employing a magnetic clutch in the manner shown in the diagrams in a traction scheme are:

(1) By declutching the motor from the wheels the motor may be used as a battery-charging generator.

(2) By declutching the motor from the wheels motor may be used for an auxiliary drive such as a hydraulic pump.

(3) It ensures that the motor has no mechanical load applied to it when the main contactor opens, so that no arcing is possible due to heavy load currents.

(4) It ensures smooth starting without "steps."

(5) It provides a reliable overload "slip" setting.

I claim:

1. In an electric motor drive system for driving a driven element against a load thereon and having a motor, a motor circuit, a shunt field winding for said motor, and automatic regulating means including a variable resistance in series with said field winding adapted to be cut-in and cut-out of said field winding to vary the field strength of said winding and the speed of said motor to automatically increase the field strength of said winding at one predetermined motor armature current value to reduce the speed and increase the torque of the motor and automatically reduce the field strength at a lower predetermined armature current value to increase the speed of said motor, in combination, and electrically operated clutch between said motor and said driven element, and operator control means movable to various positions to control the operations of said clutch and the speed of said motor subject to said automatic regulating means, said positions being so related that movement of said control means to increase the speed of said motor is preceded by take-up of said load by said clutch and return movement of said control means to decrease the speed of said motor precedes disengagement of said clutch, said control means being operatively connected to said resistance to cut-in and cut-out said resistance responsive to movement of said control means, said clutch being arranged to take up said load before said resistance is cut in by said control means and being disengaged only after said resistance is cut out by said control means.

2. In an electric motor drive-system for driving a driven element against a load, the combination of a direct-current motor having an armature and a shunt field-winding, a field-reducing resistance, a field-switch for placing said resistance in series with said field winding, an automatic speed-control switch electrically connected to said resistance adapted to cut out at least a part thereof when the field-switch has placed it in series, an electromagnet in series with the motor armature for automatically actuating said speed-control switch to cut out resistance at one predetermined armature current value and to cut in said resistance at a lower predetermined armature current, a clutch between the motor and the driven element, a starting switch in the armature circuit for starting and stopping the motor, operator-controlled means for controlling the operation of said starting switch said clutch and said field-switch subject to said electromagnet and automatic speed-control switch, said operator-controlled means being operative to engage said clutch only after said motor has been started and to operate the field switch to place the field-reducing resistance into series with the field winding and so to render the automatic speed-control switch effective only after the clutch has been engaged.

3. In an electric motor drive system, the combination as claimed in claim 2 wherein the clutch is an electromagnetic clutch.

4. In an electric motor drive system, the combination as claimed in claim 2 wherein the clutch is an electromagnetic clutch having slip and further having clutch slip-controlling means including a variable regulating resistance.

5. In an electric motor drive-system for driving a driven element against a load, the combination of a direct-current motor having an armature and a shunt field-winding, a field-reducing resistance, a field-switch for placing said resistance in series with said field winding, an automatic speed-control switch electrically connected to said resistance adapted to cut out at least a part thereof when the field-switch has placed it in series, an electromagnet in series with the motor armature for automatically actuating said speed-control switch to cut out resistance at one predetermined armature current value and to cut in said resistance at a lower predetermined armature current, a clutch between the motor and the driven element, a starting switch in the armature circuit for starting and stopping the motor, operator-controlled means movable to various positions to control the operations of said starting-switch, said clutch and said field-switch means, said positions being so related that movement of said control means in one direction successively starts the motor, engages said clutch and puts said field-resistance into series with the field-winding, and so renders the automatic speed control switch effective and in return direction successively cuts out said field-regulating resistance with the automatic speed-control, disengages the clutch and stops the clutch and stops the motor.

6. In an electric motor drive-system for driving a driven element against a load, the combination of a direct-current motor having an armature and a shunt field-winding, a field-regulating resistance in series with said field-winding, field regulating means for bringing said resistance into series with the field to a greater or less amount, an automatic speed-control switch in addition to said regulating means and electrically connected to the field regulating resistance adapted to cut out at least a part thereof when the field-regulating means has placed it in series with the field winding, an electromagnet in series with the motor armature for automatically actuating said speed-control switch to cut out resistance at one predetermined armature current value and to cut in said resistance at a lower predetermined armature current, a clutch between the motor and the driven element, a starting switch in the armature circuit for starting and stopping the motor, operator-controlled means for controlling the operation of said starting switch said clutch and said field regulating means subject to said electromagnet and automatic speed-control switch, said operator-controlled means being operative to engage said clutch only after said motor has been started and to operate the field regulating means to place the field-reducing resistance into series with the field winding and so to render the automatic speed-control switch effective only after the clutch has been engaged.

7. In an electric motor drive-system for driving a driven element against a load, the combination of a direct-current motor having an armature and a shunt field-winding, a field-regulating resistance in series with said field-winding, field regulating means for bringing said resistance into series with the field to a greater or less amount, an automatic speed-control switch in addition to said regulating means and electrically connected to the field regulating resistance adapted to cut out at least a part thereof when the field-regulating means has placed it in series with the field winding, an electromagnet in series with the motor armature for automatically actuating said speed-control switch to cut out resistance at one predetermined armature current value and to cut in said resistance at a lower predetermined armature current, a clutch between the motor and the driven element, a starting switch in the armature circuit for starting and stopping the motor, operator-controlled means movable to various positions to control the operations of said starting-switch, said clutch and said field-regulating means, said positions being so related that movement of said control means in one direction successively starts the motor, engages said clutch and puts said field-resistance into series with the field-winding, and so renders the automatic speed control switch effective and in return direction successively cuts out said field-regulating resistance with the automatic speed-control, disengages the clutch and stops the motor.

ALFRED ERWIN REGINALD ARNOT.

REFERENCES CITED

The following references are of record in the file of this patent:

UNITED STATES PATENTS

| Number | Name | Date |
| --- | --- | --- |
| 493,425 | Edison | Mar. 14, 1893 |
| 1,054,144 | Sandidge | Feb. 25, 1913 |
| 1,140,545 | Townsend | May 25, 1915 |
| 1,233,877 | Henderson | July 17, 1917 |
| 1,762,130 | Davis | June 3, 1930 |
| 1,922,294 | Honey | Aug. 15, 1833 |
| 2,170,546 | Candor | Aug. 22, 1939 |
| 2,200,376 | Shaver | May 14, 1940 |
| 2,345,418 | Neuner | Mar. 28, 1944 |
| 2,408,993 | Nardone | Oct. 8, 1946 |